United States Patent
Offenhaeuser et al.

(10) Patent No.: US 10,407,077 B2
(45) Date of Patent: Sep. 10, 2019

(54) METHOD FOR ASCERTAINING A DEGREE OF AWARENESS OF A VEHICLE OPERATOR

(71) Applicant: Robert Bosch GmbH, Stuttgart (DE)

(72) Inventors: Andreas Offenhaeuser, Marbach am Neckar (DE); Erik Lesser, Steinheim (DE); Felix Trautwein, Marbach (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 14/902,685

(22) PCT Filed: May 14, 2014

(86) PCT No.: PCT/EP2014/059886
§ 371 (c)(1),
(2) Date: Jan. 4, 2016

(87) PCT Pub. No.: WO2015/000621
PCT Pub. Date: Jan. 8, 2015

(65) Prior Publication Data
US 2016/0167671 A1 Jun. 16, 2016

(30) Foreign Application Priority Data
Jul. 5, 2013 (DE) .................. 10 2013 213 236

(51) Int. Cl.
*B60W 40/08* (2012.01)
*B60W 50/14* (2012.01)
*B60K 28/06* (2006.01)
*B60Q 9/00* (2006.01)
*B60T 7/12* (2006.01)
(Continued)

(52) U.S. Cl.
CPC ............ *B60W 40/08* (2013.01); *B60K 28/06* (2013.01); *B60Q 9/00* (2013.01); *B60T 7/12* (2013.01);
(Continued)

(58) Field of Classification Search
CPC ...................................................... B60Q 9/008
See application file for complete search history.

(56) References Cited

U.S. PATENT DOCUMENTS

2004/0150514 A1* 8/2004 Newman ............... B60Q 9/008
340/435
2005/0073136 A1 4/2005 Larsson et al.
(Continued)

FOREIGN PATENT DOCUMENTS

CN 101048305 A 10/2007
CN 101755294 A 6/2010
(Continued)

OTHER PUBLICATIONS

International Search Report for PCT/EP2014/059886, dated Nov. 25, 2014.

*Primary Examiner* — Imran K Mustafa
(74) *Attorney, Agent, or Firm* — Norton Rose Fulbright US LLP; Gerard Messina

(57) ABSTRACT

In a method for ascertaining a degree of attentiveness of a vehicle driver during travel with his vehicle, e.g., a motor vehicle, using a sensor of the vehicle, a direction of vision of the vehicle driver toward a region of a surrounding environment visible to the driver is recognized, and the region visible to the vehicle driver is assigned a probability distribution through which, on the basis of the recognized direction of vision of the vehicle driver, a degree of attentiveness of the vehicle driver is ascertained.

25 Claims, 2 Drawing Sheets

(51) Int. Cl.
*B62D 15/02* (2006.01)
*B60W 50/00* (2006.01)

(52) U.S. Cl.
CPC ........... *B60W 50/14* (2013.01); *B62D 15/025*
(2013.01); *B60W 2040/0818* (2013.01); *B60W 2040/0863* (2013.01); *B60W 2040/0872* (2013.01); *B60W 2050/0051* (2013.01); *B60W 2050/0089* (2013.01); *B60W 2420/42* (2013.01)

(56) References Cited

U.S. PATENT DOCUMENTS

| | | | |
|---|---|---|---|
| 2006/0251297 A1* | 11/2006 | Hammoud | A61B 5/18 382/118 |
| 2007/0146146 A1* | 6/2007 | Kopf | B60Q 9/008 340/575 |
| 2008/0236929 A1 | 10/2008 | Fukaya et al. | |
| 2010/0033333 A1* | 2/2010 | Victor | A61B 3/113 340/576 |
| 2013/0058529 A1* | 3/2013 | Levin | A61B 3/113 382/103 |

FOREIGN PATENT DOCUMENTS

| | | |
|---|---|---|
| DE | 10 2007 062511 | 7/2008 |
| DE | 10 2008 038859 | 2/2010 |
| DE | 10 2011 116301 | 4/2012 |
| EP | 1 300 108 | 4/2003 |
| EP | 2 000 889 | 12/2008 |
| EP | 2 564 766 | 3/2013 |
| WO | WO 2013/008302 | 1/2013 |

* cited by examiner

METHOD FOR ASCERTAINING A DEGREE OF AWARENESS OF A VEHICLE OPERATOR

BACKGROUND OF THE INVENTION

1. Field of the Invention

The present invention relates to a method for ascertaining a degree of attentiveness of a vehicle driver when traveling with his vehicle, in particular a motor vehicle. In addition, the present invention relates to a computer program product that is fashioned to carry out a method according to the present invention; to a computing unit or processing device, preferably a control apparatus or a control device for a vehicle; and to a safety device or a safety system for a vehicle, in particular a driver assistance system for a motor vehicle.

2. Description of the Related Art

Active safety is one of the points of emphasis in the development of current and future motor vehicle systems. Known safety or driver assistance systems in the region of active safety of motor vehicle occupants, i.e. provided in order to avoid accidents of the relevant motor vehicle, include for example an electromechanical servo steering EPS (Electronic Power Steering) having automatic steering intervention, an electronic stability program ESP (ESC, Electronic Stability Control) for stabilizing the motor vehicle through braking interventions in the driving dynamic boundary range, as well as VDM (Vehicle Dynamic Management) as an expansion of ESP through additional automated steering interventions.

However, a frequent cause of accidents not addressed by these systems is inattentiveness, or a degree of attention of the vehicle driver, during travel with his vehicle. Frequently accidents occur because the driver becomes distracted and no longer participates in a traffic situation with an at least adequate degree of concentration. Current systems for acquiring the inattentiveness of the vehicle driver are based on an interpretation of his driving behavior, such as poor lane tracking. In addition, there exist approaches for realizing visual inattentiveness, i.e. the driver turning his direction of view away from a traffic event, through recognition of a head position or direction of view of the vehicle driver. Such systems distinguish between only two states, namely "attentive" and "not attentive."

BRIEF SUMMARY OF THE INVENTION

An object of the present invention is to provide a method with which it is possible in reliable and robust fashion to determine a degree of attentiveness of a vehicle driver when traveling with his vehicle. The method according to the present invention should be capable of working together with an already-existing safety device, a safety system, or the like, in order to increase its effectiveness. The method according to the present invention should operate safely and reliably, and should be economical in its realization. The method should be capable of being realized using sensor equipment and/or actuator equipment already installed in a motor vehicle. In addition, it is an object of the present invention to indicate, in a corresponding manner, a computer program, a computing unit, or a processing device, and to indicate a safety device or a safety system.

In the method according to the present invention, using a sensor, detector, or a sensor system, and using a safety device or a safety system of the vehicle, a direction of vision of the vehicle driver toward a region of a surrounding environment visible to the driver is recognized, i.e. sensed, detected, or determined. According to the present invention, the region visible to the vehicle driver is assigned a preferably preset probability distribution by which, on the basis of the recognized direction of vision of the vehicle driver, a prespecified degree of attentiveness of the vehicle driver can be ascertained and preferably outputted. The sensor or detector that senses or detects the direction of view of the vehicle driver is preferably a passenger compartment video camera, and the direction of vision can be determined by recognizing a direction of view and/or by recognizing a head position of the vehicle driver.

The region of the surrounding environment that is visible to the driver and relevant for the present invention can be the maximum environment visible to the driver, i.e. inter alia everything that can be seen through the windshield of the vehicle, including an edge region, which can include for example a dashboard, a combined instrument panel, a steering wheel, a radio, etc. However, it makes sense to limit this maximum visible region, e.g. to omit a rearward part, and to cause the region visible toward the front and to the left and right to overlap approximately 165° to 270°, which is limited by the edges of inclusion of the vehicle windshield. Here, preferably at least an upper segment of the dashboard, an upper segment of the steering wheel, and a surface of a radio are included.

A degree of attentiveness for a maximum distraction of the vehicle driver, i.e. a minimum degree of attentiveness of the vehicle driver, is assigned to a direction of vision that goes beyond this usefully visible region (see below). The probability distribution can also be referred to as a probability matrix, or virtual probability distribution or matrix, and is stored in an electronic memory module, preferably as an electronic matrix. That is, the region visible to the vehicle driver, in particular the region that can be seen by the driver to the front, to the right, and to the left, is thus preferably represented by a probability matrix. In addition, the term "sensor" can subsume the terms "sensor system," "detector," etc., and the term "safety device" can subsume the terms "safety system," "driver assistance system," etc.

According to the present invention, during the travel of the vehicle driver with his vehicle, a current degree of attentiveness of the vehicle driver can be ascertained from the probability distribution and/or outputted. According to the present invention, the method is continually repeated with a temporal step width, such that, given a comparatively long-lasting, e.g. t>2.5 seconds to 4 seconds, low or lowest degree of attentiveness an alarm is preferably outputted. A useful temporal step width of the method is for example a multiple of approximately 5 ms±2 ms. Depending on a temporal resolution of the video camera, the degree of attentiveness can be ascertained at each image, at each second, each third, each fourth, each fifth, each sixth, approximately each eighth, approximately each tenth, approximately each twelfth, approximately each fifteenth, approximately each twentieth, approximately each twenty-fifth, or approximately each thirtieth image.

In specific embodiments of the present invention, an integral value or mean value—normed if warranted—of the degree of attentiveness ($z_k$) can be formed through a multiplicity of degrees of attentiveness of the vehicle driver ascertained temporally one after the other. Here, such an integral value or mean value of the degree of attentiveness of the vehicle driver is preferably limited in its magnitude upward and downward. In addition, such an integral value or mean value of the degree of attentiveness can contain those degrees of attentiveness, ascertained temporally one after the other, of the vehicle driver that, starting from a current ascertaining of the degree of attentiveness, extend back into the past by a certain time duration.

According to the present invention, the current degree of attentiveness of the vehicle driver and/or the integral value or mean value of the degree of attentiveness can be provided to a safety device or a safety system of the vehicle, in particular outputted thereto. Preferably, a scale for the degree of attentiveness is applied that extends from z=−1 for the highest degree of attentiveness (concentrated view directed toward the traffic situation in front) up to z=1 for the lowest degree of attentiveness (view directed far away from the traffic situation in front, e.g. toward the interior of the vehicle).

Given the presence of a comparatively high degree of attentiveness—integral value or mean value e.g. $z_k \approx -0.3$ to $-1 \pm 0.1$—the safety device can act passively.

Given the presence of a comparatively long-lasting (e.g. more than 2.5 seconds to 5 seconds) low degree of attention—integral value or mean value e.g. $z_k \approx -0.2$ to $1 \pm 0.2$—the safety device can output a warning to the vehicle driver. In addition, a preferably automated intervention in the vehicle can take place temporally after a warning when there is a continued (e.g. longer than 1 second to 3 seconds) low degree of attentiveness—integral value or mean value e.g. $z_k \approx -0.2$ to $-1 \pm 0.2$.

The warning to the vehicle driver can be an optical, acoustic, and/or haptic signal to the vehicle driver. The intervention in the vehicle can be a preferably automated braking intervention, acceleration intervention, and/or steering intervention. Temporally after the intervention in the vehicle, the driver can be requested to take over the vehicle and/or to accelerate the vehicle. Preferably, the warning and/or the intervention is carried out by the safety device of the vehicle, fashioned as the driver assistance system.

According to the present invention, the probability distribution can be assumed to be fixed for the vehicle. In addition, according to the present invention the probability distribution can be fixed for the vehicle in the case of essentially straight-line travel of the vehicle, and, in the case of an expected or executed change of direction of the vehicle, the probability distribution can change dynamically with the change in direction of the vehicle. Such a dynamic concomitant shifting of the probability matrix can for example be initiated when a turn signal is activated and there is a subsequent steering action, and/or only when there is a steering action. The dynamic concomitant shifting is preferably correlated with the steering action, such that a speed of travel can also be taken into account.

According to the present invention, the method can be used in a driver assistance system of a vehicle in order to increase traffic safety. The computer program according to the present invention has program code means that are fashioned to carry out a method according to the present invention when the program code means are executed on a processing device and/or are stored on a computer-readable data carrier. The computing unit or processing device according to the present invention, preferably the control apparatus or the control device, is fashioned such that it can carry out a method according to the present invention, and/or can execute a computer program according to the present invention.

The safety device according to the present invention or the safety system according to the present invention for a vehicle, in particular a driver assistance system for a motor vehicle, is set up such that it can execute a method according to the present invention in order to ascertain a degree of attentiveness of a vehicle driver. In addition, the safety device or the safety system can have a computer program product according to the present invention and/or a computing unit according to the present invention and/or a processing device according to the present invention. According to the present invention, the safety device or the safety system can have a recognition unit, an interpretation unit, and/or an output unit.

According to the present invention, an already-existing method for increasing active and/or passive safety can be expanded or supplemented by the method according to the present invention. In addition, the method according to the present invention can be realized by itself as a warning method for the vehicle driver or as a method for introducing an intervention in the vehicle. The intervention is then however taken over by an intervention method that is executed temporally after it, e.g. in an evasion assistant unit. The method according to the present invention can operate safely, robustly, and reliably, and is economical in its realization, because the method can be realized using sensor equipment and, if warranted, actuators already installed in a motor vehicle.

In the following, the present invention is explained in more detail on the basis of exemplary embodiments with reference to the accompanying drawing. The Figures of the drawing are schematic and are not scale.

DETAILED DESCRIPTION OF THE INVENTION

The present invention relates to a system for interpreting a direction of vision $rot_x$, $rot_y$ (see FIG. 1), in particular a head position and/or a direction of view, of a vehicle driver, and for deriving a particular quantity, e.g. a visual distraction, referred to in the following as degree of attentiveness m, z. An overall system according to the present invention is preferably made up of the components recognition unit 10, interpretation unit 20, and output unit 30 (cf. FIG. 2).

Recognition unit 10 is in particular set up such that it recognizes a direction of vision $rot_x$, $rot_y$ of a vehicle driver and outputs it in the form of coordinates at each point in time or at determined points in time. Interpretation unit 20 is in particular set up such that it ascertains a degree of attentiveness m, z of the vehicle driver from the recognized direction of vision $rot_x$, $rot_y$. Output unit 30 is in particular set up such that it outputs the ascertained degree of attentiveness m, z of the vehicle driver.

Figure 1:
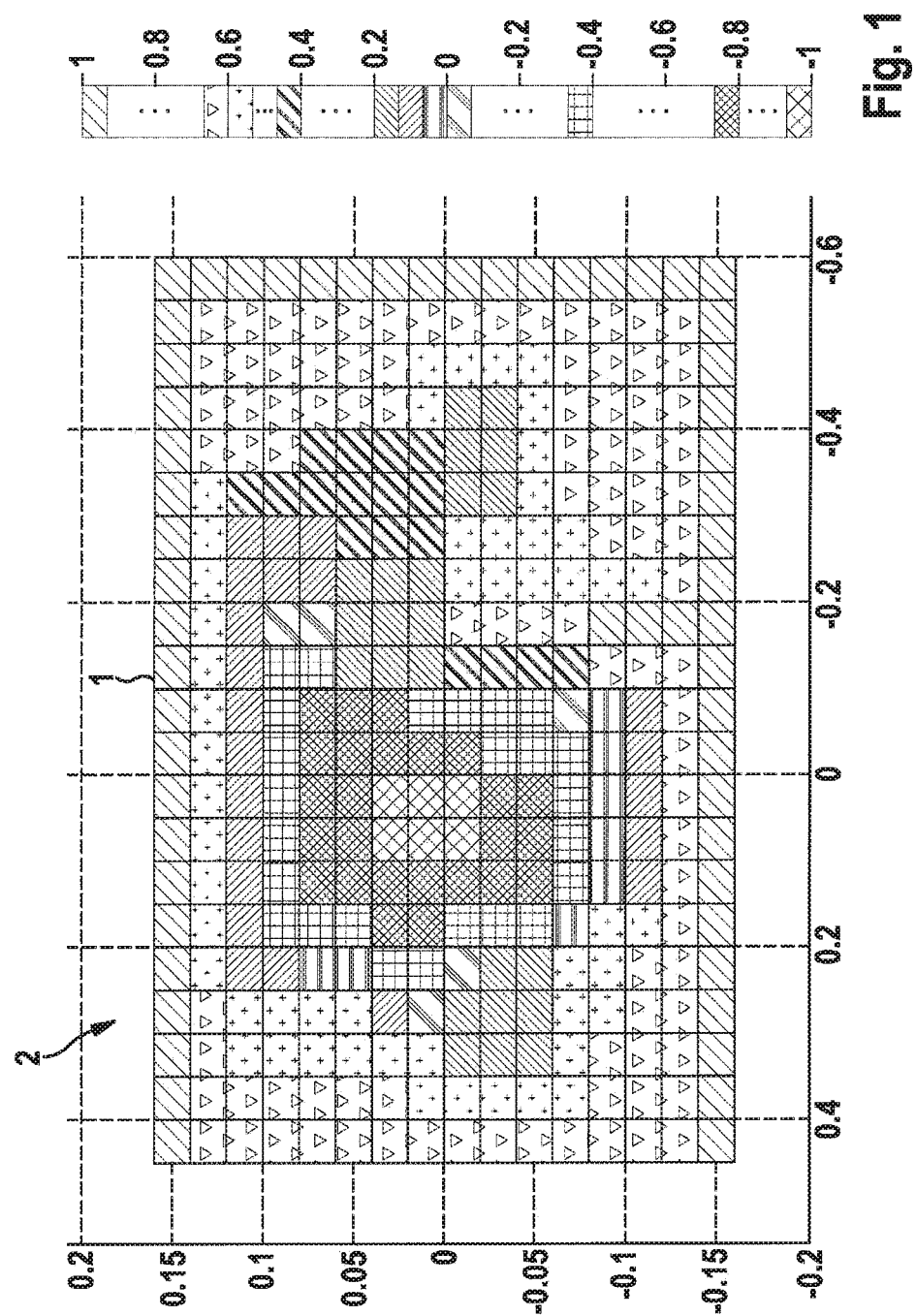
FIG. 1 shows a probability distribution over a region visible to a driver of a motor vehicle, through which a degree of attentiveness of the vehicle driver is ascertained according to the present invention.

The interpretation of the direction of vision $rot_x$, $rot_y$ does not take place via a hard distinction between OK and not-OK regions and their dwell time, as in the existing art, but rather via a probability distribution W or probability matrix W. This probability distribution W represents a general region 1 visible to the driver of the vehicle. In FIG. 1, it can be seen how on an X axis (abscissa) a rotational position, or rotation of the head of the vehicle driver along the spinal column (head rotation) and, along the y-axis (ordinate), a nodding position or nodding movement of the head, is plotted.

According to the present invention, a probability m is assigned to discrete points or regions, this being the probability with which the driver's directing his/her view in this direction will result in distraction from a general traffic situation. "Blue" regions (values −0.15 to −1), with values close to −1, here mean that it is guaranteed that this will not cause visual distraction, and may even reduce distraction, i.e. in these regions the vehicle driver is mentally participating in the traffic situation. In FIG. 1, this is for example a region of a front windshield that, during normal travel, the vehicle driver looks at, with his view directed toward the street and/or the person traveling in front.

At the other end of the scale there is the value 1 ("red" regions 0.5 to 1), representing extreme distraction on the part of the vehicle driver. This is for example a complete edge region, such that any direction of view past this boundary, which may also be the boundary of recognition unit 10, is to be understood as a very large turning away of the view, and thus as a very high degree of distraction. The three "yellow" regions (values 0.15 to 0.3) in the probability distribution W represent the rearview mirror of the vehicle. Direction of view in this region is not highly distracting, but can lead to distraction if held for a longer period of time.

"Orange-colored" regions correspondingly extend from 0.3 to 0.5, and "green" regions extend from 0.15 to −0.15. An assignment ahead of time of the individual probabilities m to probability distribution W over visible region 1 is accomplished through deliberation, empirical observation, and/or experiment if warranted. Intermediate regions in visible region 1, or in probability distribution W, can be interpolated through surrounding points or regions, in particular interpolated in linear or quadratic fashion, and edge regions can be extrapolated if warranted.

In the normed probability distribution W shown in FIG. 1, in which the highest degree of attentiveness m=−1 and the lowest degree of attentiveness m=1, for example the following degrees of attentiveness m can be used.

Preferably, high and highest degrees of attentiveness m=−0.5 to −1 are assigned to all those directions of vision $rot_x$, $rot_y$ that are directed to a general traffic situation in front. Preferably, low and lowest degrees of attentiveness m=0.6 to 1 are assigned to all those directions of vision $rot_x$, $rot_y$ that are situated outside the general traffic situation, which applies for example in particular to views directed inside the vehicle, such as toward the radio, the edge of a windshield, etc.

In the case of a direction of vision $rot_x$, $rot_y$ that is essentially directed straight ahead, an essentially high or highest degree of attentiveness m=−0.6 to −1 can thus be assigned. In the case of a direction of vision $rot_x$, $rot_y$ directly adjacent to a direction of vision that is essentially straight ahead, an essentially medium to high degree of attentiveness m=−0.3 to −0.6 can be applied. In the case of the direction of vision $rot_x$, $rot_y$ directed toward a mirror or toward a combined instrument panel of the vehicle, an essentially slightly lower degree of attentiveness m=0.1 to 0.3 can be assigned. In addition, it is possible to leave out of account temporally comparatively short glances at a mirror or toward the combined instrument panel of the vehicle, or even to interpret these as a slightly high degree of attentiveness m=−0.05 to −0.1 (not shown).

In the case of a direction of vision $rot_x$, $rot_y$ directed beyond a region within which a traffic situation normally plays out, an essentially medium to strong low degree of attentiveness m=0.5 to 0.9 can be applied. In the case of a direction of vision $rot_x$, $rot_y$ directed toward an edge of perception of a windscreen of the vehicle or beyond, an essentially lowest degree of attention (m=1) can be assigned. And, in addition, in the case of a direction of vision $rot_x$, $rot_y$ directed laterally to the direction of travel of the vehicle, the essentially lowest degree of attentiveness m=1 can likewise be assigned.

In order to ascertain distraction or a degree of attentiveness m, z of the vehicle driver during travel with his vehicle from the probability distribution W shown in FIG. 1, at each specified point in time t the probability m is read out from probability distribution W. For example, using the equation:

$$z_{k+1} = z_k + \Delta t \cdot P \cdot m(rot_x, rot_y)$$

a degree of attentiveness z of the vehicle driver can be calculated. Of course, other equations can also be used.

Here $\Delta t$ is a temporal step width of the method, P is a parameter for determining an increase, or a rise/fall, of m in $z_{k+1}$, $m(rot_x, rot_y)$ is a probability m currently read out from probability distribution W, $rot_x$ is a rotational position of the head about the X axis, and $rot_y$ is a rotational position of the head about the Y axis. A calibration of P at $\Delta t$ takes place for example through deliberation, empirical observation, and/or experiment if warranted.

Through integration and/or mean value formation of probabilities W there results a robust system that, through the degrees of freedom of probability matrix W, permits the formation of transitions between the relevant regions. This is preferable because recognition unit 10 does not always operate without error, and as a result it can happen that the vehicle driver's direction of view is not always immediately acquired correctly. Given a hard distinction between OK and not-OK, this would cause very large deviations in an overall result. With the approach according to the present invention, these effects are significantly reduced.

Figure 2:
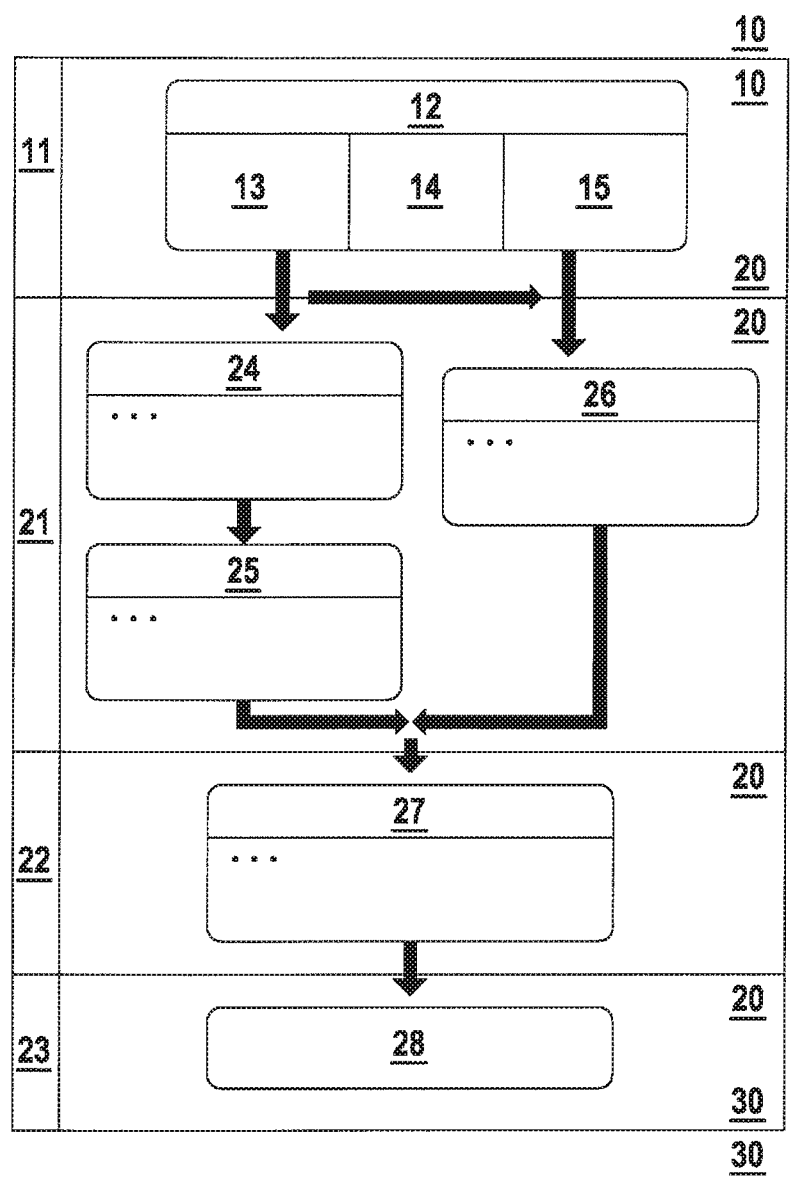
FIG. 2 shows an example of a program sequence of the method according to the present invention that can be executed in an interpretation unit of a safety device of the motor vehicle.

FIG. 2 shows an example of a program sequence of the method according to the present invention in interpretation unit 20, which essentially includes a signal processing and an evaluation. In addition, interpretation unit 20 can include an input, which however can also be realized in recognition unit 10, and an output, which can also be realized in output unit 30.

In the input, the input data for the method are read in and validated if warranted. For example given the use of a video camera as sensor, these include data such as head orientation, head position, and validity of these data. In addition, travel data, such as speed, steering intervention, etc., can be applied. In addition, the method requires the parameters for the actual method, such as the parameter P, the temporal step width $\Delta t$, the probability distribution W, etc. (see above).

The signal processing includes an offset compensation, a compensation for seating distance, and a modification for validity. In the offset compensation there takes place a stabilization of the not-always-reliable sensor/system data; in the seating distance compensation there takes place a determination of a distance of the head of the vehicle driver from the virtual probability distribution W, and in the validity modification there takes place a stabilization of the data validity.

In the evaluation of interpretation unit 20, the integral or averaged degree of attentiveness z is determined from a multiplicity of degrees of attentiveness m. Thus, for example the above equation is applied. Here the value of the integral or averaged degree of attentiveness z can for example be limited to the values −1 and 1. In addition, only degrees of attentiveness m can be applied that go back into the past by a certain time duration. At the output, the degree of attentiveness z can be outputted or queried.

A further advantage of the method according to the present invention or of the safety device according to the present invention is that probability distribution W, or probability matrix W, can very easily be changed, in order for example to measure how high a probability is with which the vehicle driver is looking at the combined instrument panel. In such a case, the region of the combined instrument panel has to be assigned the value 1, and all other regions −1.

What is claimed is:

1. A method for ascertaining a degree of attentiveness of a driver of a motor vehicle during a driving operation, comprising:
   detecting an operational parameter of the motor vehicle during the driving operation, and selecting a predetermined probability distribution from a plurality of predetermined probability distributions as a function of the detected operational parameter;
   detecting, using a sensor of the vehicle, a direction of vision of the driver toward a region of a surrounding environment visible to the driver;
   assigning the selected predetermined probability distribution to the region of the surrounding environment visible to the vehicle driver, the region including a plurality of subregions, the probability distribution assigning a respective one of a plurality of different values for each subregion, including at least one value indicating a high probability that the direction of vision being directed to the subregion will result in distraction, at least one value indicating a low probability that the direction of vision being directed to the subregion will result in distraction, and at least one value indicating an intermediate probability that the direction of vision being directed to the subregion will result in distraction; and
   ascertaining, on the basis of the detected direction of vision of the vehicle driver and the assigned probability distribution of the region of the surrounding environment, a degree of attentiveness of the vehicle driver.

2. The method as recited in claim 1, wherein the method is repeated periodically, and wherein an alarm is outputted in the case of a degree of attentiveness below a predefined minimum threshold lasts longer than a predefined maximum threshold time period.

3. The method as recited in claim 2, wherein:
   the method is repeated periodically to ascertain a multiplicity of degrees of attentiveness of the vehicle driver temporally one after the other; and
   one of an integral value or mean value of the degree of attentiveness of the vehicle driver is formed using the multiplicity of degrees of attentiveness ascertained, and one of (i) the one of the integral value or mean value of the degree of attentiveness is limited in magnitude to a specified range having an upper boundary and a lower boundary, or (ii) the one of the integral value or mean value of the degree of attentiveness containing degrees of attentiveness of the vehicle driver ascertained temporally one after the other which extend into the past by a specified time duration from a current ascertaining of the degree of attentiveness.

4. The method as recited in claim 3, wherein at least one of: (i) the current degree of attentiveness of the vehicle driver is provided to one of a safety device or a safety system of the vehicle, or (ii) the one of the integral value or mean value of the degree of attentiveness is provided to the one of the safety device or the safety system of the vehicle.

5. The method as recited in claim 4, wherein at least one of:
   (i) as a function of speed, the safety device behaves passively when a degree of attentiveness is above a predefined attentiveness threshold;
   (ii) as a function of speed, the safety device outputs a warning to the vehicle driver when a degree of attentiveness below the predefined attentiveness threshold lasts for longer than a first predefined threshold time period; or
   (iii) as a function of speed, an intervention in the vehicle operation takes place when, after a warning has been output, a degree of attentiveness below the predefined attentiveness threshold persists for longer than a second predefined threshold time period.

6. The method as recited in claim 5, wherein at least one of:
   the vehicle is a home vehicle;
   the sensor is a passenger compartment camera;
   the direction of vision of the vehicle driver is ascertained based on at least one of a direction of view of the vehicle driver and a head position of the vehicle driver;
   a temporal step width with which the degree of attention of the vehicle driver of the vehicle is updated is one of 10 ms±5 ms, 25 ms±10 ms, 50 ms±15 ms, 75 ms±20 ms, 100 ms±25 ms, 150 ms±30 ms, 200 ms±40 ms, and 300 ms±50 ms;
   the safety device for the vehicle is a driver assistance system;
   the warning to the vehicle driver is at least one of an optical, acoustic, and haptic signal to the vehicle driver;
   the intervention in the vehicle is at least one of an automated braking intervention, acceleration intervention, and a steering intervention in the vehicle; and
   temporally after the intervention in the vehicle, a request is made to the vehicle driver for at least one of vehicle takeover and acceleration of the vehicle.

7. The method as recited in claim 1, wherein each of the plurality of subregions is substantially rectangular.

8. The method as recited in claim 1, wherein the region of the surrounding environment is delimited by borders of a windshield of the vehicle.

9. The method as recited in claim 8, wherein the region of the surrounding environment includes portions of at least one of: a dashboard of the vehicle, a steering wheel of the vehicle, or a surface of a radio of the vehicle.

10. The method as recited in claim 1, further comprising retrieving the predetermined probability distribution from an electronic memory module.

11. The method as recited in claim 1, wherein a first predetermined probability distribution is selected for a detected operational parameter representing substantially straight-line travel of the vehicle, and a second probability distribution is selected for a detected operational parameter representing changing direction of the vehicle.

12. The method as recited in claim 1, wherein the ascertaining the degree of attentiveness includes:
   determining a value of the probability distribution corresponding to the detected direction of vision of the driver, and
   determining the degree of attentiveness based on the determined value.

13. The method as recited in claim 12, wherein the ascertaining the degree of attentiveness further includes:
   forming a current attentiveness value by multiplying the determined value of the probability distribution by at least one factor; and
   adding the current attentiveness value to a previously determined degree of attentiveness.

14. The method as recited in claim 13, wherein the at least one factor includes a temporal step width.

15. The method as recited in claim 13, wherein the at least one factor includes a predetermined parameter value.

16. The method as recited in claim 1, wherein the detected operational parameter includes at least one of: an activation of a turn signal of the vehicle, a steering angle of the motor vehicle.

17. The method as recited in claim 1, wherein the ascertaining the degree of attentiveness of the vehicle driver is performed periodically, and the method further comprises ascertaining, based on a multiplicity of the periodically ascertained degrees of attentiveness, at least one of: integral value of the periodically ascertained degrees of attentiveness of the vehicle driver, or a mean value of the periodically ascertained degrees of attentiveness of the vehicle driver.

18. The method as recited in claim 17, further comprising:
providing the integral or mean value of the degree of attentiveness to a safety device of the vehicle, and operating the safety device as a function of the integral or mean value of the degree of attentiveness to at least one of: output a warning to the vehicle driver, or perform an intervention in the vehicle operation.

19. The method as recited in claim 1, providing the degree of attentiveness to a safety device of the vehicle, and operating the safety device as a function of the degree of attentiveness to at least one of: output a warning to the vehicle driver, or perform an intervention in the vehicle operation.

20. A non-transitory, computer-readable data storage medium storing a computer program having program codes which, when executed on a computer, perform a method for ascertaining a degree of attentiveness of a driver of a motor vehicle during a driving operation, the method comprising:
detecting an operational parameter of the motor vehicle during the driving operation, and selecting a predetermined probability distribution from a plurality of predetermined probability distributions as a function of the detected operational parameter;
detecting, using a sensor of the vehicle, a direction of vision of the driver toward a region of a surrounding environment visible to the driver;
assigning the selected predetermined probability distribution to the region of the surrounding environment visible to the vehicle driver, the region including a plurality of subregions, the probability distribution assigning a respective one of a plurality of different values for each subregion, including at least one value indicating a high probability that the direction of vision being directed to the subregion will result in distraction, at least one value indicating a low probability that the direction of vision being directed to the subregion will result in distraction, and at least one value indicating an intermediate probability that the direction of vision being directed to the subregion will result in distraction; and
ascertaining, on the basis of the detected direction of vision of the vehicle driver and the assigned probability distribution of the region of the surrounding environment, a degree of attentiveness of the vehicle driver.

21. The non-transitory, computer-readable data storage medium as recited in claim 20, wherein a first predetermined probability distribution is selected for a detected operational parameter representing substantially straight-line travel of the vehicle, and a second probability distribution is selected for a detected operational parameter representing changing direction of the vehicle.

22. The non-transitory, computer-readable data storage medium as recited in claim 20, the method further comprising providing the degree of attentiveness to a safety device of the vehicle, and operating the safety device as a function of the degree of attentiveness to at least one of: output a warning to the vehicle driver, or perform an intervention in the vehicle operation.

23. A driver assistance system for a motor vehicle for ascertaining a degree of attentiveness of a driver of the motor vehicle during a driving operation, comprising:
a recognition unit configured to detect an operational parameter of the motor vehicle during the driving operation, and detect a direction of vision of the driver toward a region of a surrounding environment visible to the driver;
an interpretation unit configured to select a predetermined probability distribution from a plurality of predetermined probability distributions as a function of the detected operational parameter, and ascertain, on the basis of the detected direction of vision of the vehicle driver and the selected predetermined probability distribution assigned to the region of the surrounding environment visible to the vehicle driver, a degree of attentiveness of the vehicle driver, the region including a plurality of subregions, the probability distribution assigning a respective one of a plurality of different values for each subregion, including at least one value indicating a high probability that the direction of vision being directed to the subregion will result in distraction, at least one value indicating a low probability that the direction of vision being directed to the subregion will result in distraction, and at least one value indicating an intermediate probability that the direction of vision being directed to the subregion will result in distraction; and
an output unit configured to output the ascertained degree of attentiveness of the vehicle driver.

24. The driver assistance system as recited in claim 23, wherein a first predetermined probability distribution is selected for a detected operational parameter representing substantially straight-line travel of the vehicle, and a second probability distribution is selected for a detected operational parameter representing changing direction of the vehicle.

25. The driver assistance system as recited in claim 23, wherein the output unit provides the degree of attentiveness to a safety device of the vehicle, and the safety device operates as a function of the degree of attentiveness to at least one of: output a warning to the vehicle driver, or perform an intervention in the vehicle operation.

* * * * *